D. O. WARD, DEC'D.
N. L. WARD, ADMINISTRATRIX.
LOCK NUT.
APPLICATION FILED MAY 27, 1912.
1,210,737.
Patented Jan. 2, 1917.
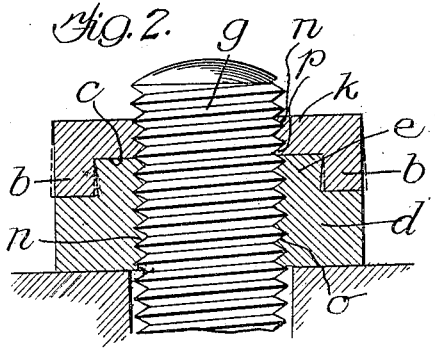
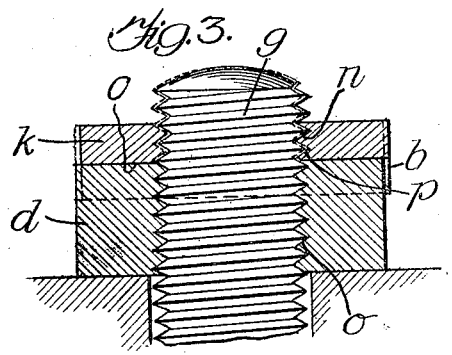
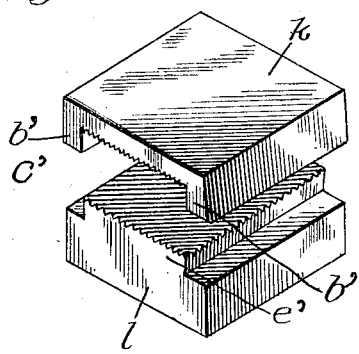
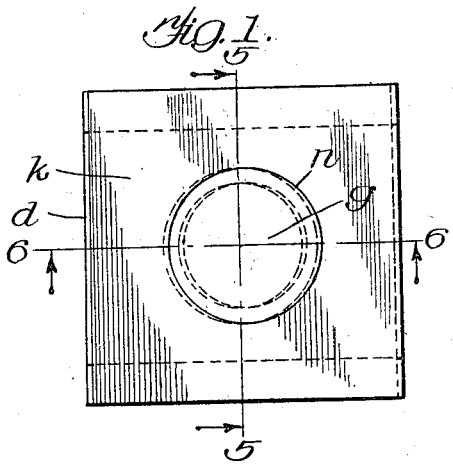
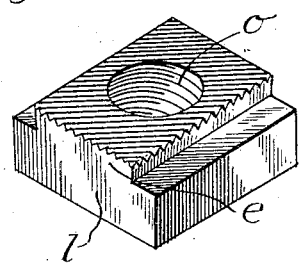
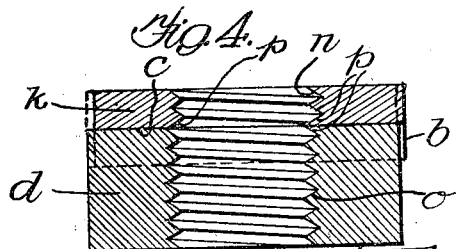

UNITED STATES PATENT OFFICE.

DANIEL O. WARD, OF OAK PARK, ILLINOIS; NELLIE LEE WARD ADMINISTRATRIX OF SAID DANIEL O. WARD, DECEASED.

LOCK-NUT.

1,210,737.  Specification of Letters Patent.  Patented Jan. 2, 1917.

Application filed May 27, 1912. Serial No. 699,863.

*To all whom it may concern:*

Be it known that I, DANIEL O. WARD, a citizen of the United States, residing in Oak Park, in the county of Cook and State of Illinois, have invented certain new and useful Improvements in Lock-Nuts, of which the following is a specification.

This invention relates to that class of lock nuts comprising a recessed or grooved perforated member, and a perforated ribbed member, tightly fitted in overlapping engagement with each other, and having their perforated portions in stepped, offset or eccentric relation to each other and affording a threaded bolt-receiving aperture through the nut, having offset or shouldered threaded wall portions or an offset thread adapted to engage and secure the nut in position upon a bolt.

The principal object of the invention is to provide a simple, economical and efficient lock nut formed of a plurality of rigidly connected members having a cylindrical threaded bolt-receiving aperture provided with offset or shouldered wall portions forming an offset thread adapted to engage and securely lock the nut in place upon a bolt.

A further object of the invention is to provide a lock nut formed of two members rigidly secured together and provided with threaded apertures in stepped, offset or eccentric relation to each other, and forming a bolt-receiving aperture through the nut, having offset or shouldered wall portions or an offset shouldered or interrupted thread portion at the point of engagement between the adjacent inner surfaces of said members adapted to impinge upon the threads of the bolt and securely lock the nut in position thereon.

Other and further objects of the invention will appear from an examination of the drawings and the following description.

The invention consists in features, combination and details of construction herein described and claimed.

In the accompanying drawings, Figure 1, a plan view of a lock nut constructed in accordance with my invention; Fig. 2, a sectional view taken on line 5—5 of Fig. 1 showing the nut in position upon a bolt; Fig. 3, a sectional view taken on line 6—6 of Fig. 1, showing the positions of the grooved and ribbed members, of which the nut is formed, after they have been shifted into position to bring the threaded apertures of the respective members into eccentric relation to the axial center of the nut and to each other; Fig. 4, a similar sectional view, showing the parts in the same position as in Fig. 3, with the bolt omitted; Fig. 5, a detail perspective view of a grooved or female member, and a ribbed or male member of suitable dimensions to form a nut, and adapted to be pressed or forced into binding engagement with each other by a bulldozer or power press, and perforated and threaded; and Fig. 6, a detail view of a nut member constructed in accordance with my improvements, illustrating the corrugated ribbed or toothed construction of the inner or meeting surface portions of the nut members.

In making a lock nut or nuts in accordance with my invention and improvements, I provide two blanks $a$, $d$ (Figs. 1 and 2), each of which is, by preference, of sufficient length to form a multiplicity of nuts, but which may be of such dimensions as to form the grooved and ribbed, or male and female members of a single nut, as shown in Fig. 5. In either case, however, the blank $a$ is of such construction that it comprises parallel flanges $b$ extending preferably longitudinally or along the opposite edges of the blank and forming a longitudinal central groove or recess $c$. The flanges $b$ are, by preference, somewhat wider or thicker at the marginal edge which enters the recessed portion of the male nut member than they are at the base, so that they each taper somewhat from said edge toward the base, and, when pressed into binding engagement with the male nut member, the recess $c$ is, by preference, of greater width at the base of the flanges $b$ than at the marginal edges of the recess or between the marginal edges of the flanges $b$. The blank $d$ is preferably of such dimensions as to be the same or substantially the same width as the blank $a$, and, after the blanks are in binding engagement, comprises a projecting rib, ridge, or central projecting body portion $e$, having laterally projecting longitudinal marginal portions or flanges $f$ on opposite sides of said projecting rib and adapted to engage the flanges $b$ upon the blank $a$ when said blanks are united. The projecting rib or body portion $e$ of the blank $d$ is, by preference, so formed as to be of greater width at its marginal edges than at its base, so as to have a binding dove-tailed engagement with the flanges *b* and recessed portion of the recessed member *a*, when said members *a* and *d* are pressed or forced into binding engagement with each other. The projecting rib or ridge *e* and the groove or recess *c* and flanges *b* on each side of said recess are of such dimensions as to fit snugly together and rigidly connect said blanks in binding engagement with each other when the latter are pressed or forced together in the manner hereinafter described, or in any desired or suitable manner, and to connect the grooved and ribbed, or male and female members of the nut when the latter is in finished form.

The blanks *a*, *d* are placed in superposed relation or one upon the other with the rib *e* extending into and substantially filling the groove *c*. In this position the blanks are placed between suitable rolls so as to force said blanks tightly together. The blanks are then placed edgewise between rolls to force the flanges *b*, *b* into engagement with the beveled sides of the rib *e*. The blank *a* therefore has dove-tailed engagement with the blank *d*. After the blanks have been pressed together in the manner stated, the same are cut into a plurality of nut sections *k*. The blanks are operated upon in the manner suggested preferably while the blanks are in a heated state. The blanks, however, may be made in the form of members *k* and *l*, having recessed and flange portions *c'* and *b'* and a rib *e'* identical with the elements *c*, *b* and *e*, already described, and all of such dimensions as to form a single nut (see Fig. 5), and these blanks may be forced together by means of a bulldozer and perforated and threaded, and then shifted with relation to each other so as to form a threaded perforation having offset threaded wall portions and offset threads, but I prefer to make the blanks and the strip or bar formed by the connected blanks of sufficient length to make a multiplicity of nuts and then cut it into sections *h*. The blanks *a* and *d*, or sections thereof, after being forced into binding engagement and while thus rigidly united, are then punched so as to provide perforations or apertures *g*, each of which is afterward threaded while the male and female members of each unit or blank are in their original positions and rigidly connected.

The making of the perforations *g* and the forming of threads may be done either before or after the strip or blanks are cut into separate sections or units, as desired, as already suggested, but the punching and threading of the blanks or units should be done while the ribbed and grooved members of the blanks or of the sections or units, formed by cutting the strip into sections, are in their original rigidly connected positions with relation to each other. The sections or nut bodies thus formed, each comprises a grooved or recessed or female member *a*, provided with flanges *b* on its opposite edges and forming a groove *c*, and a ribbed, ridged, or male member *d*, having a central longitudinal rib or ridge portion *e* extending into and rigidly secured in position within the recess *c*, as already described (see Figs. 1 and 2).

The united blanks *a* and *d*, or the sectional portions of the strip, which are formed by dividing the strip into units, are, preferably, punched while in their original rigid relation to each other, as already suggested, so as to form a threaded perforation *g* through both of said members. The perforations *g* are, by preference, threaded while said members are still in their original position, so as to provide a helical thread *m* which extends through both of the members of the nut or unit. This threaded perforation *g* is straight and the thread is uniform throughout its entire length when thus formed. After the thread has been formed the members *a* and *d* are shifted laterally with respect to the axial center of the nut or unit formed thereby and with respect to each other, from positions indicated in dotted lines in Figs. 3 and 4 to the positions indicated in full lines in said figures, so as to provide a threaded wall portion *n* in the recessed member *a*, and a threaded portion *o* in the ribbed or male member *d*, which are in offset relation to each other and in offset or eccentric relation to the axial center of the nut as a whole, and form an offset, shouldered or interrupted threaded portion *p* at the point where the inner surfaces of the rib *e* and grooved portion *c* of the respective members *a* and *d* are in engagement. The offset or interrupted thread portion *p* is thus adapted to engage and to be securely held in binding engagement with the threads of a bolt, so as to lock the nut securely in place thereon.

The members *a* and *d* may be shifted with respect to each other either before or after the nut is mounted upon the bolt to which it is to be secured, and this shifting of the members may be accomplished by means of striking one of the members a blow sufficient to shift it to the position desired, or by pressure sufficient to press it into such position. It may be accomplished by employing any suitable means such as a hammer or a plunger of a power-press, but, preferably, by placing the members between rolls having nut-engaging surfaces of such form as to shift said members to the desired position with relation to each other.

As already suggested the portion *k* of the nut may be readily shifted from the position indicated in dotted lines in Fig. 6 to the position in which said member is shown in said figure in full lines, or laterally with respect to the part $d$, by striking the part $k$ with a hammer, or by pressure applied in any desired manner adapted to accomplish such shifting. As any desired means may be employed, it is deemed unnecessary to describe such means herein. The purpose of the corrugations shown on the inside surfaces of the parts $k$ and $l$ in Fig. 8, is to more securely unite the parts of the members when they are pressed together. The corrugations or teeth on the opposite members cut into each other when pressed together in such a manner as to securely hold the parts from shifting laterally with respect to each other.

The grooved and ribbed members, when so shifted or pressed into a position in which the perforated portions of said members are offset or eccentric, are so tightly and rigidly united as to retain their relative positions and form rigidly connected parts of a nut, which parts or members will not become loosened or shifted with respect to each other by reason of any stresses or strains to which the nut, or nut and bolt, or the respective parts of the nut are subjected in use.

I claim:

1. A lock nut comprising a recessed perforated member and a ribbed perforated member in binding engagement with each other, the perforated portions of said members being threaded and disposed in such relation to each other as to form a bolt-receiving aperture having circular offset threaded wall portions provided with offset thread portions.

2. A lock nut comprising a recessed member, provided with a threaded perforation, and a ribbed member provided with a threaded perforation and having a rib portion extending into said recess and in rigid engagement with the recessed member, said perforations being so disposed with relation to each other as to form offset threaded wall portions having thread portions in offset relation to each other at the point of engagement between the grooved member and ribbed member.

3. A lock nut comprising a recessed member and a ribbed member having a rib portion of greater width at its marginal edges than at its base extending into said recess and in dovetailed engagement with the recessed member, said recessed and ribbed members being provided with threaded perforations in offset relation to each other and forming a bolt-receiving aperture through the nut having offset threaded wall portions adapted to engage and lock the nut upon a bolt.

4. A lock nut comprising in its construction a recessed member and a ribbed member, having a rib portion extending into said recess and in rigid engagement with the recessed member, said members being provided with threaded perforations offset with relation to each other and in perpendicular relation to the inner engaging surfaces of said members and forming a bolt-receiving aperture through the nut having offset threaded wall portions adapted to engage and lock the nut in position upon a bolt.

DANIEL O. WARD.

Witnesses:
HARRY IRWIN CROMER,
CHARLES H. POOLE.

Copies of this patent may be obtained for five cents each, by addressing the "Commissioner of Patents, Washington, D. C."